(No Model.) 2 Sheets—Sheet 1.
E. DEVONSHIRE.
REVOLVING WATER PURIFIER.
No. 439,590. Patented Oct. 28, 1890.
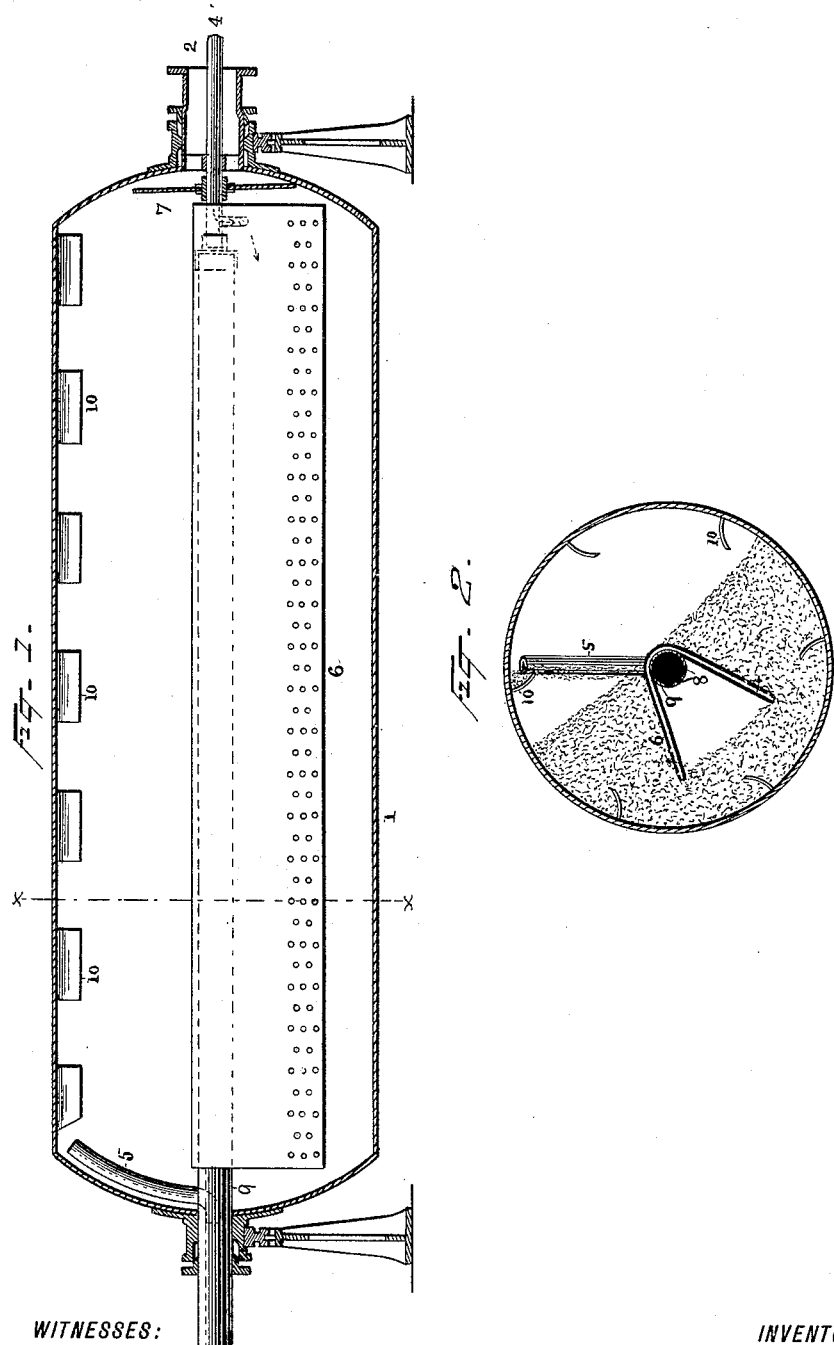
WITNESSES:
INVENTOR
Easton Devonshire
BY
Dyer & Seely,
ATTORNEYS (No Model.) 2 Sheets—Sheet 2.
E. DEVONSHIRE.
REVOLVING WATER PURIFIER.
No. 439,590. Patented Oct. 28, 1890.
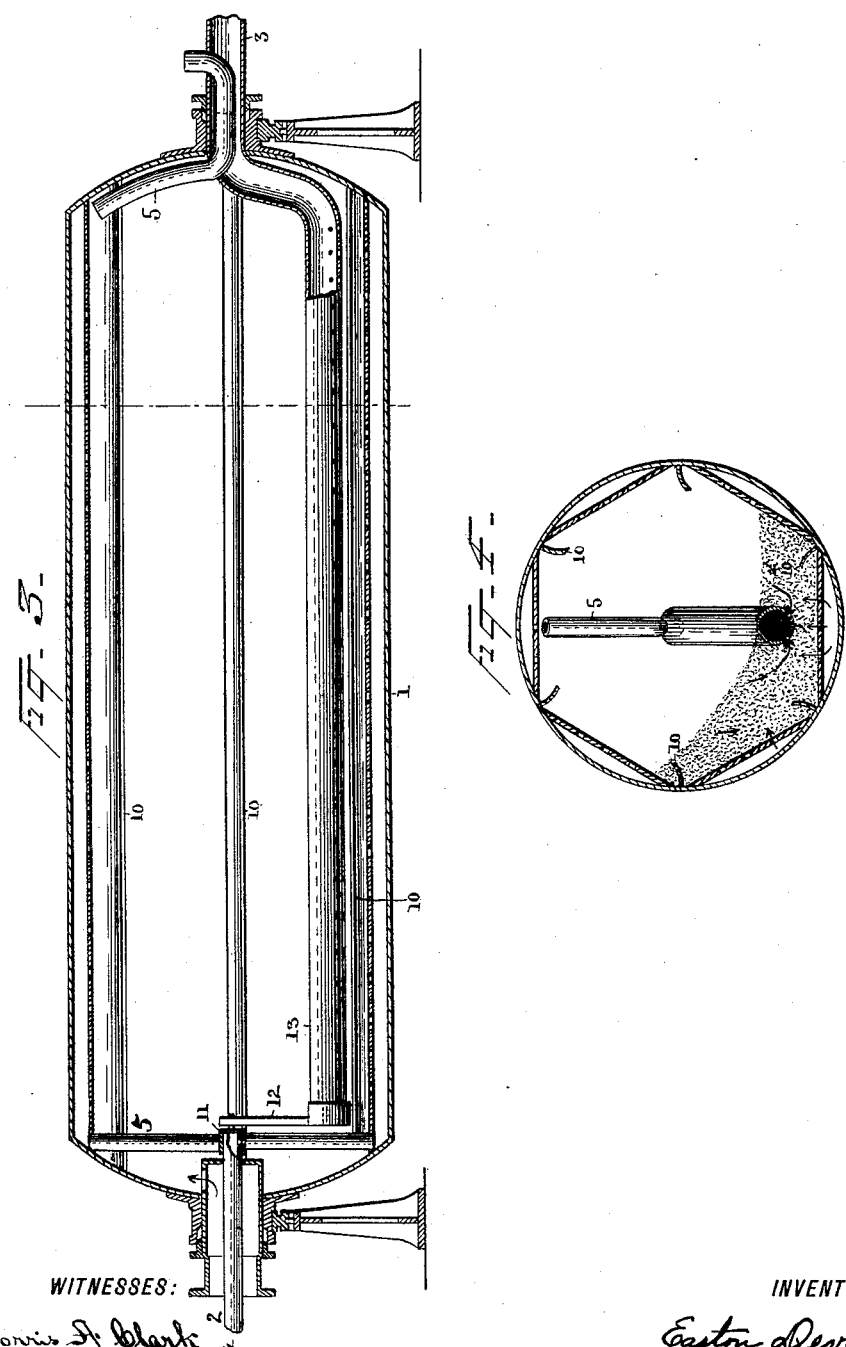
WITNESSES:
INVENTOR
BY
ATTORNEYS.

UNITED STATES PATENT OFFICE.

EASTON DEVONSHIRE, OF LONDON, ENGLAND, ASSIGNOR TO THE REVOLVING PURIFIER COMPANY, LIMITED, OF SAME PLACE.

REVOLVING WATER-PURIFIER.

SPECIFICATION forming part of Letters Patent No. 439,590, dated October 28, 1890.

Application filed April 25, 1890. Serial No. 349,445. (No model.)

*To all whom it may concern:*

Be it known that I, EASTON DEVONSHIRE, of London, county of Middlesex, England, a subject of the Queen of Great Britain, have invented an Improvement in Revolving Water-Purifiers, which is described in the accompanying specification.

My invention relates to that class of water-purifiers in which comminuted iron, spongy iron, or other chemically-acting material is constantly agitated and at the same time the water to be treated is brought into intimate contact therewith prior to filtration in an ordinary sand or other filter.

The present invention is an improvement upon apparatus invented by William Anderson.

The main object of my invention is to thoroughly aerate the water during its passing through the apparatus.

In the accompanying drawings, which illustrate my invention, Figure 1 is a longitudinal section of the purifier. Fig. 2 is a cross-section thereof on the line $x$ $x$, looking toward the left. Fig. 3 is a central longitudinal section of a modified form, and Fig. 4 is a cross-section thereof.

1 is a revolving cylinder having water inlet and outlet passages, one at either end, and also air inlet and outlet passages.

The form of apparatus illustrated in Figs. 1 and 2 will first be described.

In Fig. 2 I have shown the mass of comminuted purifying material in the cylinder, the surface of which assumes an inclined position, as indicated, on account of the revolution of the cylinder. The mass fills the cylinder about half full. Upon the axis of the cylinder and extending into the purifying material is a double-walled angular casing, the outer wall being perforated near its edge. As before stated, the air or a suitable gas, as carbonic oxide, enters at one end, as at 4. It passes, as indicated by the arrow, to the space between the walls of the casing and thence out through the numerous perforations therein, rises through the water, and escapes through pipe 5, which is stationary and extends to the upper side of the cylinder. The water entering at 2 strikes the stationary distributing-plate 7, which is preferably nearer the end of the cylinder at the bottom than at the top for the purpose of causing a larger proportion of the water to pass upward and along in the cylinder, instead of directly downward. In order to escape it is obliged to pass through the mass of purifying material and under the lower edges of the angular casing 6, through the perforations 8 in the pipe 9, and thence out, as before indicated. 10 10 are a series of scoops or shells which, as the cylinder revolves, raise the purifying material and shower it down, thereby keeping the material loose and in an active condition. These shelves or scoops are preferably in short sections, instead of being continuous through the whole length of the cylinder, as heretofore. Only a few of these shelves are shown in the longitudinal section, Fig. 1, and none in Fig. 3, but it will be understood that they are arranged around the cylinder, as indicated in Figs. 2 and 4.

Referring to Fig. 3, it will be seen that the air-inlet pipe is provided with a box 11, which communicates with an air-space at the bottom of the cylinder, as in the application executed by me on January 28, 1890, Serial No. 349,443. In this apparatus, as in that shown in Figs. 1 and 2, the pipes 2 3 4 are stationary, and the cylinder revolves around them. A bracket 12 is loosely hung on a pin projecting from the end of the box and supports the end 13 of the perforated water-pipe. In using this purifier air is forced in at 4, passes to the lower air space or spaces, rises through the purifying material and water, and out through pipe 5. Water enters at 2, and to escape from the cylinder must pass downward through the purifying material and out through the perforated outlet-pipe.

The arrows on Fig. 4 indicate the direction of the air and the water, respectively.

The advantages of the arrangement which I have described will be obvious. Both the air and the water have to pass through practically the whole of the loose constantly-agitated mass of purifying material at the same time, but in opposite directions. This brings the elements into intimate contact under favorable circumstances to promote the desired chemical action.

While the air and water inlets have been described as being at the same end of the cylinder, they might be at opposite ends. In that case it would only be necessary to extend the air-outlet pipe 5, as indicated in Fig. 3, so that it should communicate directly with the outside air, and introduce the water at 3, allowing it to escape at 2. When used in this way, the water issuing from the perforated pipe would meet the rising air and both would pass upward through the purifying material together.

Having thus described my invention, what I claim is—

1. The combination of a revolving cylinder containing purifying material, a water-inlet passage at one end of the cylinder, a water-outlet below the surface of the purifying material and extending out at the opposite end of the cylinder, an air-inlet connecting with an air-space below the water and purifying material, whereby the water flowing in one direction through the purifying material meets the air flowing in the opposite direction, substantially as described.

2. The combination of a revolving cylinder containing purifying material, means for agitating said material, an air-chamber with perforated wall below the surface of the purifying material, and a water-outlet also below the surface of said material, substantially as described.

3. The combination of a revolving cylinder containing purifying material, shelves on the inner periphery of the cylinder for moving the purifying material, a water-outlet pipe perforated on its lower side and embedded in said material, and means for introducing air, substantially as described.

4. The combination of a revolving cylinder approximately one-half full of purifying material, a perforated water-outlet pipe embedded therein, a water-inlet above the surface of the purifying material, and an air-chamber with air-outlets below the surface, substantially as described.

This specification signed and witnessed this 24th day of February, 1890.

EASTON DEVONSHIRE.

Witnesses:
CHARLES M. CATLIN,
D. H. DRISCOLL.